July 13, 1954 D. L. DOVER 2,683,312
FRUIT CORING DEVICE
Filed Dec. 18, 1952
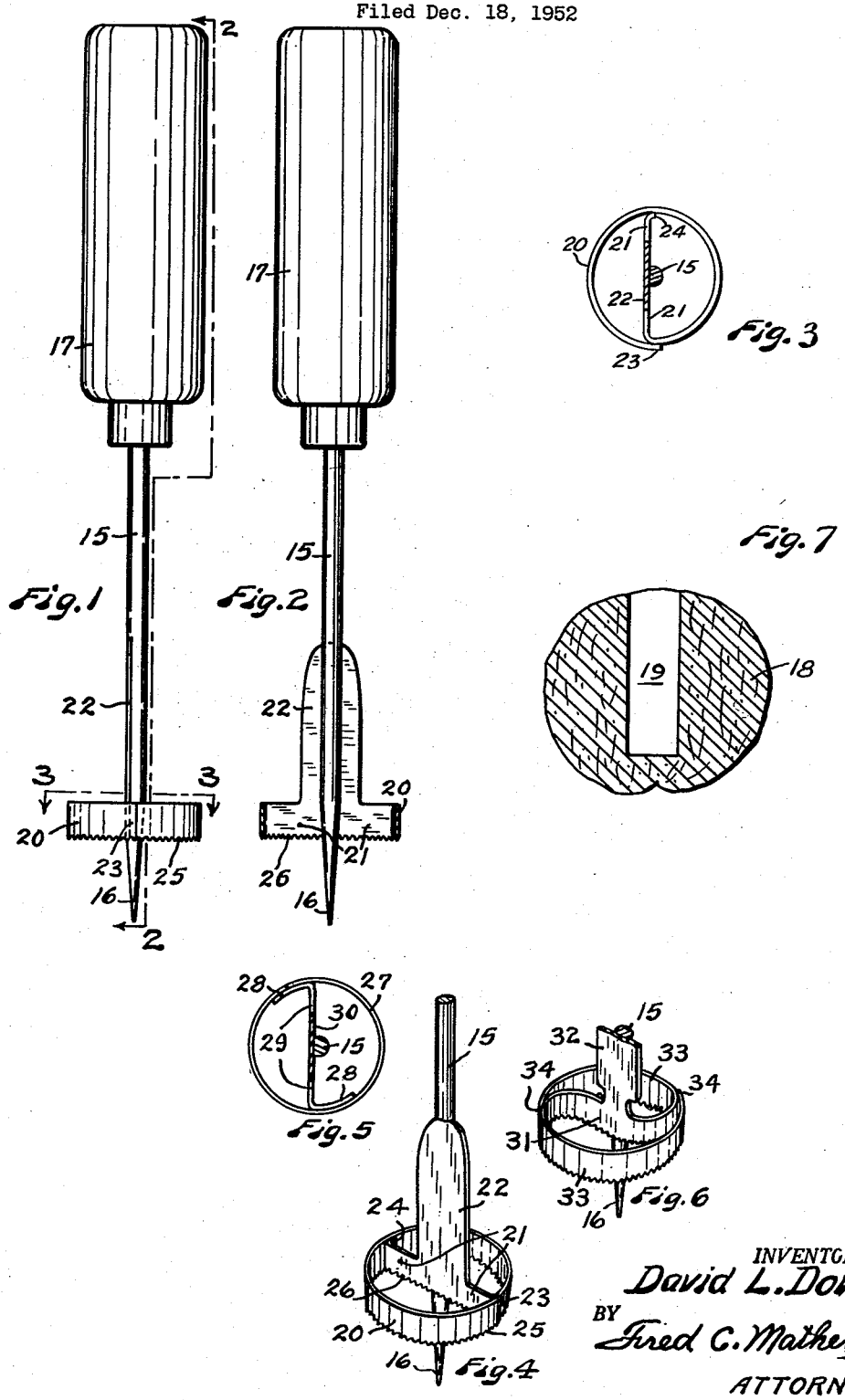
INVENTOR.
David L. Dover
BY Fred C. Matheny
ATTORNEY Patented July 13, 1954

2,683,312

UNITED STATES PATENT OFFICE 2,683,312

FRUIT CORING DEVICE

David L. Dover, Seattle, Wash.

Application December 18, 1952, Serial No. 326,696

2 Claims. (Cl. 30—302)

This invention relates to fruit coring devices of a type especially well adapted for coring apples which are to be cooked whole.

In preparing apples for baking it is desirable to first remove the cores and to put sugar or like material into the core cavity. However, it is difficult to remove the core of an apple with a knife without cutting entirely through the apple and it is difficult to retain sweetening material or the like in the core cavity if the apple is cut entirely through.

An object of this invention is to provide a fruit coring device which can be used to remove the core from fruit, such as an apple, without cutting entirely through the fruit thus leaving in the fruit a cup shaped receptacle into which sweetening, flavoring or the like may be placed and retained during the baking process.

Another object of this invention is to provide a coring device comprising a substantially cylindrical cutting ring of thin material adapted to cut a cylindrical hole in the core portion of an apple or like fruit, a handle rigid with and extending outwardly from the cutting ring, whereby the cutting ring may be pressed into the fruit, a core splitting and core shear-off blade extending across the cutting ring to split and shear off the core, and a stop member rigid with the ring and protruding from the side of the ring opposite the handle to contact a support on which the fruit rests and prevent the ring from cutting entirely through the fruit.

Other objects of the invention are to provide a small hand operated fruit coring device which is simple in construction, not expensive to manufacture, easy to use and highly efficient in removing the desired amount of core from an apple or the like.

Other objects of the invention will be apparent from the following description and accompanying drawings.

Fig. 1 is a side elevation of a fruit coring device constructed in accordance with this invention.

Fig. 2 is a view partly in section and partly in elevation taken substantially on broken line 2—2 of Fig. 1.

Fig. 3 is a view partly in section and partly in plan taken substantially on broken line 3—3 of Fig. 1.

Fig. 4 is a perspective view, with parts broken away, of the fruit coring device shown in Figs. 1, 2 and 3.

Fig. 5 is a view partly in plan and partly in section, similar to Fig. 3 but showing a modified form of the invention.

Fig. 6 is a fragmentary perspective view, similar to Fig. 4 but showing a modified form of the invention.

Fig. 7 is a sectional view on a smaller scale than the other views showing a piece of fruit which has been cored with a device constructed in accordance with this invention.

Like reference numerals designate like parts throughout the several views.

Figs. 1 to 4 inclusive show an embodiment of this invention comprising a handle shank 15 which may be in the form of a metal rod tapered substantially to a point 16 at one end and having a hand hold 17 fixedly attached to or mounted on its other end portion.

The means for cutting out and removing the core from an apple 18, Fig. 7, to leave therein a well 19 which is closed at the bottom end comprises a cutting ring 20, a core splitting and core shear-off blade 21 and a thin flat core carrier member 22. In the form of invention shown in Figs. 1 to 4 the parts 20, 21 and 22 are all formed of a single piece of thin sheet metal, such as stainless steel. This may be done by making one end portion of the blade 21 long enough to form the cutting ring 20, bending this part into cylindrical form, overlapping the tip end 23 of this part and securing this overlapped tip 23 to the part which it overlaps as by welding or soldering or brazing. The tip 24 of the shorter end portion of the blade 21 is bent over at approximately right angles and rigidly secured to the inner side of the ring member 20. The blade 21 thus forms a substantially diametrical strut across the ring member 20. The core carrier member 22 extends perpendicularly from the core splitting and shear-off blade in the same plane as said blade. The blade 21 and core carrier 22 are both rigidly secured, as by welding, soldering or brazing the same, to the handle shank 15. Preferably the part of the handle shank 15 to which these parts 21 and 22 are secured is flattened, as shown in Figs. 1 and 3.

The cutting ring 20 and core splitting blade 21 are provided with serrated or saw toothed cutting edges 25 and 26 respectively and these saw toothed or serrated edges are further preferably sharpened so they will cut more easily. The cutting ring 20 is positioned adjacent to but spaced from the pointed end 16 of the handle shank so that the pointed end 16 forms a depth gauge and stop member to prevent the cutting ring from being pressed entirely through an apple or the like when the apple is placed on or against a support, such as a table or board.

Obviously the form of construction of this coring device may be varied. For instance, Fig. 5 shows a coring device having a cutting ring 27 made of a separate piece of metal welded or otherwise rigidly secured to two bent over end portions 28 of a core splitting blade 29. The blade 29 has a core carrier 30. The parts 27, 29 and 30 correspond to the parts 20, 21 and 22 of Figs. 1 to 4 inclusive and the parts 30 and 29 are secured to a handle shank 15 of the form shown in Figs. 1 to 4.

The coring device shown in Fig. 6 has a core splitting and shear-off blade 31 of approximately S shape. A core carrier 32 is rigid with the blade 31 and both are secured to a handle shank 15 of the form disclosed in Figs. 1 to 4. The outer end portions 33 of the S-shaped blade member 31 are of approximately equal length and are bent cylindrically so that each forms approximately one half of a cutting ring. The tip 34 of each cutting ring part 33 overlaps the other part of the ring and is welded or otherwise rigidly attached thereto. The S-shaped blade member 31 extends across the cutting ring 33 and functions in a manner similar to the blade members 21 and 29 except that it splits the core along curved lines.

In coring an apple with any of the devices shown in Figs. 1 to 6 inclusive the apple is placed on a support and held with one hand with its core substantially perpendicular to the support. The point 16 of the coring device is then inserted into the apple axially of the core and the coring device is pressed into the apple until the point 16 contacts the support. As the cutting ring is pressed into the apple it severs a cylindrical piece of core and the splitter knife splits this piece of core. After the cutting ring has been stopped before it cuts entirely through the apple and while the apple is held against rotation the coring device is rotated sufficiently to shear off the piece of core which has been cut loose. The coring device is then withdrawn from the apple and the severed and split pieces of core are withdrawn with it and may easily be jarred loose from the coring device by tapping the same lightly. The core pieces tend to adhere to the carrier member 22 and this member 22 insures that the cut loose pieces of core will be removed from the apple along with the coring device. The point 16 goes entirely through the end of the apple which rests on the support but this point is axially positioned and is of small diameter and after the coring device has been rotatively moved to shear off the core and is then withdrawn the hole left by the point 16 will close tightly enough so that the cup 19 which is left in the apple will not even allow the leakage of liquid or juices. Sweetening or other material may be introduced into this cup 19 to be cooked into the apple in the baking process. Also the cavity 19 allows free access of heat into the apple for more thorough and even cooking of the same.

While this device is particularly well adapted for coring apples it will be understood that the same may be used in connection with other fruits.

The foregoing description and accompanying drawings clearly disclose preferred embodiments of this invention but it will be understood that this disclosure is merely illustrative and that changes may be made within the scope of the following claims.

I claim:

1. A fruit coring device comprising a substantially cylindrical cutting ring having a cutting end portion; a depth gauge stop member rigid with said cutting ring and extending axially outwardly from the cutting end portion thereof; a handle secured to said cutting ring and extending from the side of the ring opposite said depth gauge stop member in a direction generally parallel to the axis of the ring; a flat metal core splitting core shear-off blade of substantial width rigid with said cutting ring and extending across the same; and a thin flat core carrier member rigid with the cutting ring and extending therefrom in the same general direction as said handle.

2. A fruit coring device comprising a substantially straight bar type handle shank pointed at one end and having a hand hold rigid with its other end portion; a cutting ring extending around said handle shank substantially coaxially thereof at a location adjacent to but spaced inwardly from the pointed end of the handle; a core splitting blade extending across said ring and supported by said shank crosswise of said shank, said core splitting blade securing said cutting ring to said shank and the pointed end of said shank forming depth gauge stop means adapted to engage with a support on which a fruit unit which is being cored rests to prevent the cutting ring and core splitting blade from cutting entirely through the fruit unit; and a core carrier member of thin metal secured to said handle shank adjacent to and in the plane of the core splitting and shear-off blade and between said blade and the hand hold.

References Cited in the file of this patent

UNITED STATES PATENTS

| Number | Name | Date |
|---|---|---|
| 1,422,066 | Vañades et al. | July 4, 1922 |
| 1,759,539 | Carlson | May 20, 1930 |
| 2,053,777 | Pekrol | Sept. 8, 1936 |
| 2,150,046 | Bard | Mar. 7, 1939 |
| 2,188,362 | Krilow | Jan. 30, 1940 |
| 2,458,215 | Sparks | Jan. 4, 1949 |
| 2,519,500 | Peterson | Aug. 22, 1950 |

FOREIGN PATENTS

| Number | Country | Date |
|---|---|---|
| 260,407 | Great Britain | Nov. 4, 1926 |